United States Patent
Xiao

(10) Patent No.: US 12,546,157 B1
(45) Date of Patent: Feb. 10, 2026

(54) PET MOVABLE DOOR AND CAT LITTER BOX

(71) Applicant: Xiaolong Technology (Shenzhen) Co., Ltd., Guangdong (CN)

(72) Inventor: Peixin Xiao, Guangdong (CN)

(73) Assignee: Xiaolong Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/076,434

(22) Filed: Mar. 11, 2025

(51) Int. Cl.
*A01K 1/01* (2006.01)
*E05D 15/16* (2006.01)
*E05F 15/665* (2015.01)

(52) U.S. Cl.
CPC .......... *E05F 15/665* (2015.01); *E05D 15/165* (2013.01); *A01K 1/0107* (2013.01); *E05Y 2201/46* (2013.01); *E05Y 2201/604* (2013.01); *E05Y 2400/30* (2013.01); *E05Y 2900/00* (2013.01)

(58) Field of Classification Search
CPC ........ A01K 29/00; A01K 29/001; A01K 1/01; E05F 15/73; E05F 15/77; E05F 15/665
See application file for complete search history.

(56) References Cited

U.S. PATENT DOCUMENTS

| | | | | |
|---|---|---|---|---|
| 9,003,705 | B1* | 4/2015 | Solowiej | E05F 11/52 |
| 9,903,148 | B2* | 2/2018 | Rodems | E05F 11/34 |
| 12,123,243 | B2* | 10/2024 | Hall | E05F 15/00 |
| 2014/0251556 | A1* | 9/2014 | Orton | E05F 15/16 |
| 2021/0123287 | A1* | 4/2021 | Miller | E05F 15/76 |
| 2024/0206422 | A1* | 6/2024 | Wang | A01K 1/01 |
| 2024/0247527 | A1* | 7/2024 | Picard | E05F 5/00 |

FOREIGN PATENT DOCUMENTS

CN 216219412 U 4/2022

* cited by examiner

*Primary Examiner* — Joshua J Michener
*Assistant Examiner* — Henry Hooper Mudd

(57) ABSTRACT

A pet movable door and a cat litter box. The pet movable door includes: a door panel, a clutch structure, and a drive unit. The drive unit is connected to the door panel in a transmission manner via the clutch structure, so as to drive the door panel to move in a predetermined direction. The clutch structure is configured to separate from each other when a force acting in a direction opposite to the predetermined direction reaches a predetermined value, such that the door panel is separated from the drive unit.

19 Claims, 9 Drawing Sheets

PET MOVABLE DOOR AND CAT LITTER BOX

TECHNICAL FIELD

The present disclosure relates to the technical field of cat litter boxes, and in particular to a pet movable door and A cat litter box.

BACKGROUND

With the popularity of pet cats, more and more people are keeping pet cats. In the process of keeping cats, the problem of cat excretion has always bothered keepers. Cats have their own special requirements for defecation. If the defecation is not cleaned in time, the cat may not be able to continue defecating or change the defecation site. Further, the excrement of cats often has a strong odor, which is a very tricky problem for people keeping pets. Therefore, an automatic cat toilet that can automatically clean up in a timely manner and can be monitored and operated remotely is needed to solve the problems faced by people who keep cats. At present, a conventional cat litter box on the market that can automatically clean up the cat litter is arranged with an automatic door to achieve complete closure to prevent the stench from overflowing. Since the automatic door is controlled by a sensor and a control device, it can easily trap cats in the event of a machine failure, making these cat litter boxes a safety hazard for cats during use.

The above content is only intended to assist in understanding the technical solution of the present disclosure, and does not mean that the above content is admitted as prior art.

SUMMARY OF THE DISCLOSURE

In view of the above problems, the present disclosure proposes a pet movable door, which is designed to solve the technical problem of cats being easily trapped after the automatic door malfunctions, which poses a great safety hazard to the cat.

A pet movable door, including: a door panel, a clutch structure, and a drive unit; wherein the drive unit is connected to the door panel in a transmission-manner via the clutch structure, to drive the door panel to move in a predetermined direction; the clutch structure is configured to separate from each other when a force acting in a direction opposite to the predetermined direction reaches a predetermined value, such that the door panel is separated from the drive unit.

In some embodiments, the pet movable door further includes a door panel guide, and a preset track extending in the predetermined direction is formed on the door panel guide; the door panel is slidably connected to the preset track in the predetermined direction.

In some embodiments, the clutch structure includes an adapter and a connecting member fixedly connected to the door panel; the adapter and the connecting member are configured to separate from each other when the force acting in a reverse direction to the drive unit reaches a predetermined difference value; the door panel guide includes a first guide rod extending in an up-down direction; the preset track extends along a length direction of the first guide rod, and the connecting member is slidably engaged with the first guide rod; and/or the pet movable door further includes a second guide rod extending in the up-down direction; the second guide rod is slidably engaged with the adapter, and the drive unit is connected to the adapter in a transmission manner to drive the door panel to reciprocate in the up-down direction.

In some embodiments, the pet movable door further includes a reduction rack and a reduction gear; the reduction rack extends in an up-down direction, the reduction gear is rotatably arranged on the door panel and/or the connecting member, and the reduction rack is engaged with the reduction gear.

In some embodiments, the pet movable door further includes an installation plate; the reduction rack, the drive unit, the door panel guide, and the second guide rod are fixedly arranged on the installation plate, and the door panel and the adapter are spaced apart from the installation plate.

In some embodiments, the pet movable door further includes an inductive switch and a trigger; the connecting member is connected to a side of the door panel facing the adapter; the trigger is arranged on an upper end of the connecting member; the inductive switch is arranged on a top end of the first guide rod; the inductive switch is electrically connected to the drive unit, to control the drive unit to stop when triggered by the trigger.

In some embodiments, the door panel guide further includes a guide rod extending in the up-down direction; the guide rod defines a guide slot extending in the up-down direction; one of both vertical side walls of the door panel is slidably connected to the first guide rod via the connecting member, and the other of the both vertical side walls of the door panel slidably engages with the guide slot.

In some embodiments, the clutch structure further includes a magnet attracter and a magnetic member that are magnetically coupled to each other; the magnet attracter is fixedly arranged on the connecting member, and the magnetic member is fixedly arranged on the adapter.

In some embodiments, the drive unit includes a drive member and a transmission member, the transmission member extending in the predetermined direction; the transmission member is connected to the clutch structure, such that the clutch structure is driven to move the door panel along the predetermined direction in condition of the drive member driving the transmission member to move.

In some embodiments, the drive member is a drive motor, and the transmission member includes a transmission belt and two transmission wheels; the two transmission wheels are arranged at intervals along the up-down direction; two ends of the transmission belt are respectively sleeved on the two transmission wheels; the adapter is fixedly connected to the transmission belt, and an output shaft of the drive motor is connected to one of the transmission wheels in a transmission manner.

A cat litter box, including a shell body and the pet movable door as above; wherein the shell body defines an entrance, and the pet movable door is arranged at the entrance; the door panel of the pet movable door is capable of opening and of closing the entrance.

In the technical solutions of the present disclosure, the drive unit is connected to the door panel in a transmission manner via the clutch structure, so as to drive the door panel to move in a predetermined direction. The clutch structure is configured to separate from each other when a force acting in a direction opposite to the predetermined direction reaches a predetermined value, such that the door panel is separated from the drive unit. In this way, while the door panel is automatically opened and closed by the drive unit, the clutch structure can be separated from each other in time when the pet cat is accidentally stuck during the movement of the door panel, and the force of the drive unit on the door panel can be removed in time, so as to prevent the drive unit from continuing to exert force on the door panel, thereby preventing the pet cat from being injured. This improves the safety performance of the pet movable door.

BRIEF DESCRIPTION OF THE DRAWINGS

In order to more clearly illustrate the technical solution of the embodiments of the present disclosure, the following is a brief description of the drawings required to be used in the description of the embodiments of the present disclosure. Obviously, the drawings in the following description are only some embodiments of the present disclosure. For those skilled in the art, without the payment of creative labor, other drawings can also be obtained based on these drawings.

REFERENCE NUMERALS

Figure 1:
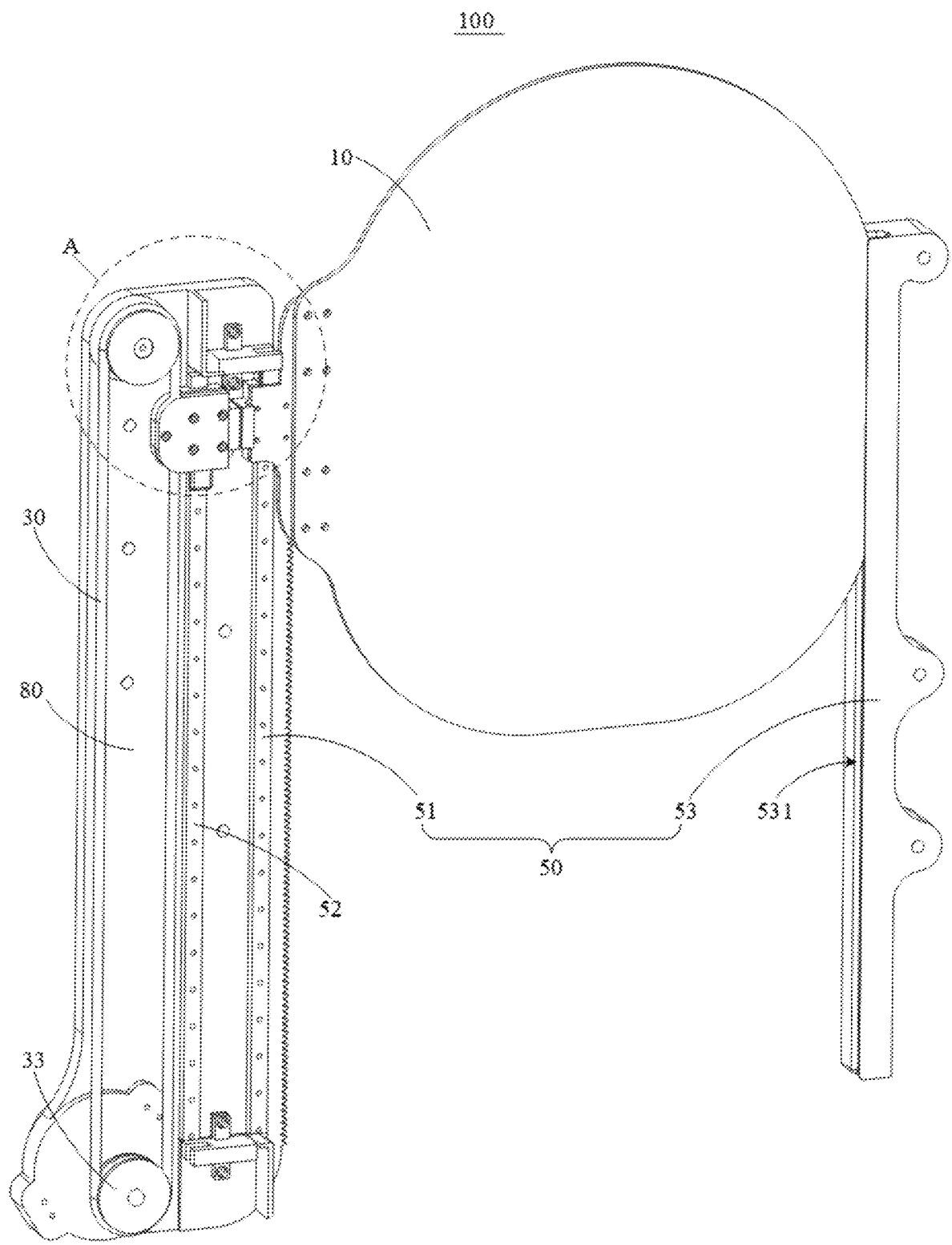
FIG. 1 is a structural schematic view of a pet movable door according to some embodiments of the present disclosure.

| No. | Name | No. | Name | No. | Name |
|---|---|---|---|---|---|
| 100 | pet movable door | 10 | door panel | 20 | adaptor |
| 30 | drive unit | 40 | connecting member | 51 | first guide rod |
| 52 | second guide rod | 53 | guide rod | 531 | guide slot |
| 61 | reduction rack | 62 | reduction gear | 71 | inductive switch |
| 72 | trigger | 41 | first mounting slot | 21 | second mounting slot |
| 31 | drive member | 32 | transmission belt | 33 | transmission wheel |
| 200 | shell body | 210 | entrance | 50 | door panel guide |
| 80 | installation plate | | | | |

The realization of the purpose, functional features, and advantages of the present disclosure will be further illustrated by reference to the accompanying drawings in combination with the embodiments.

DETAILED DESCRIPTION

The following will clearly and completely describe the technical solution in the embodiments of the present disclosure in conjunction with the accompanying drawings in the embodiments of the present disclosure. Obviously, the embodiments described are only some of the embodiments of the present disclosure, not all of them. Based on the embodiments in the present disclosure, all other embodiments obtained by those skilled in the art without creative effort are within the scope of the present disclosure. In addition, the technical solutions of the embodiments may be combined with each other, but they must be based on what those skilled in the art can achieve. When the combination of technical solutions is contradictory or impossible, it should be considered that such combination of technical solutions does not exist and is not within the scope of the present disclosure.

It should be noted that when the embodiments of the present disclosure involve directional indications (such as up, down, left, right, front, back, etc.), such directional indications are only intended to explain the relative positional relationship between various components and the movement situation in a particular posture. When the particular posture changes, the directional indications will also change accordingly.

In addition, when the embodiments of the present disclosure involve descriptions such as "first" and "second", such descriptions of "first" and "second" are for descriptive purposes only and should not be construed as indicating or implying their relative importance or implying a specified number of technical features. Therefore, features that are defined as "first" or "second" may expressly or impliedly include at least one such feature. In addition, the meaning of "and/or" appearing throughout the text is to include three alternatives in parallel, for example "A and/or B", which includes alternative A, or alternative B, or both A and B.

The present disclosure proposes a pet movable door 100, which is intended to solve the technical problem of how to improve the safety performance of the pet movable door. The pet movable door 100 may be mounted at an entrance 210 of a cat litter box, and of course, it may be mounted at a pet entrance opening on a normal door.

Figure 2:
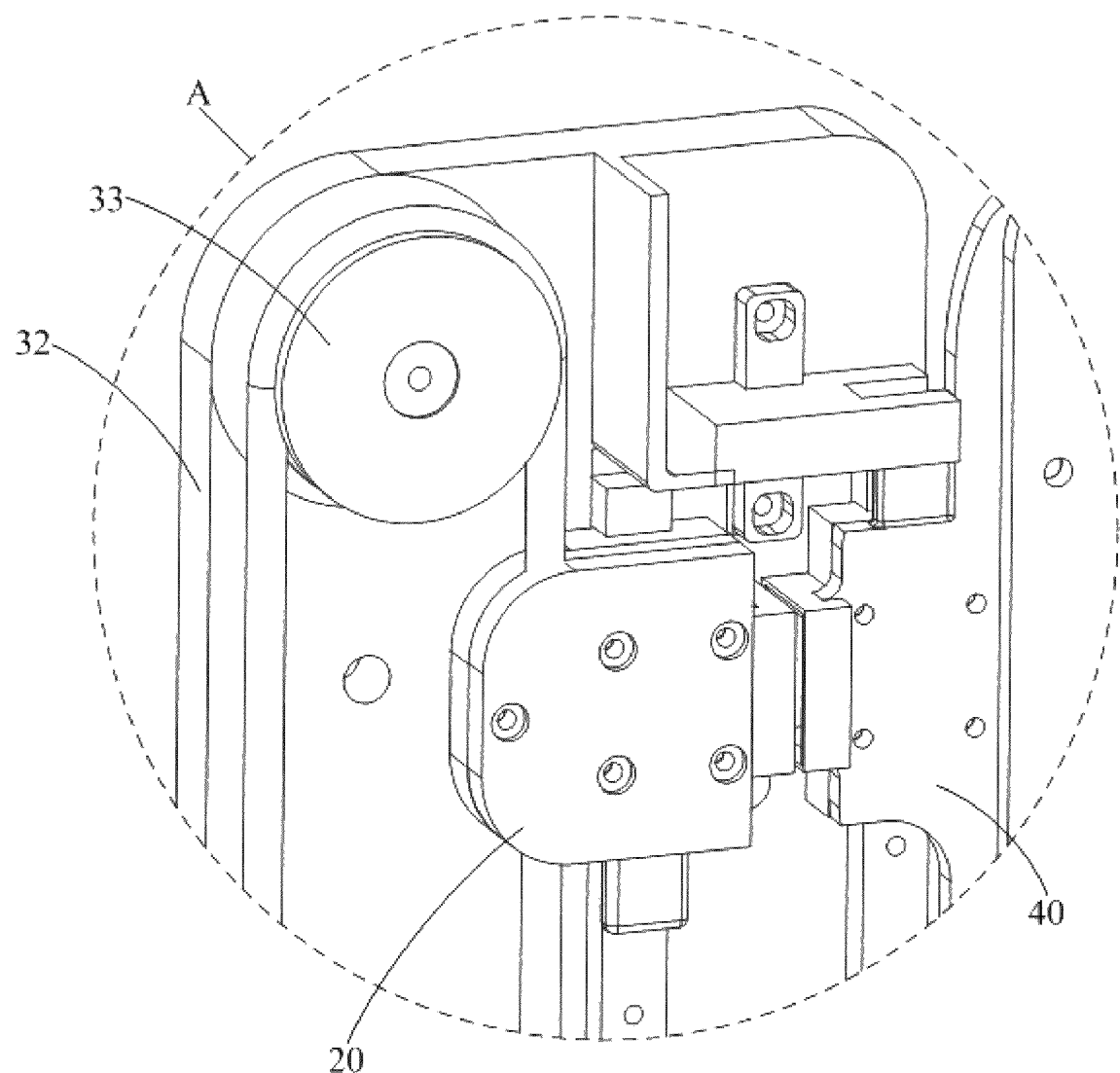
FIG. 2 is an enlarged view of area A circumscribed in FIG. 1.
Figure 3:
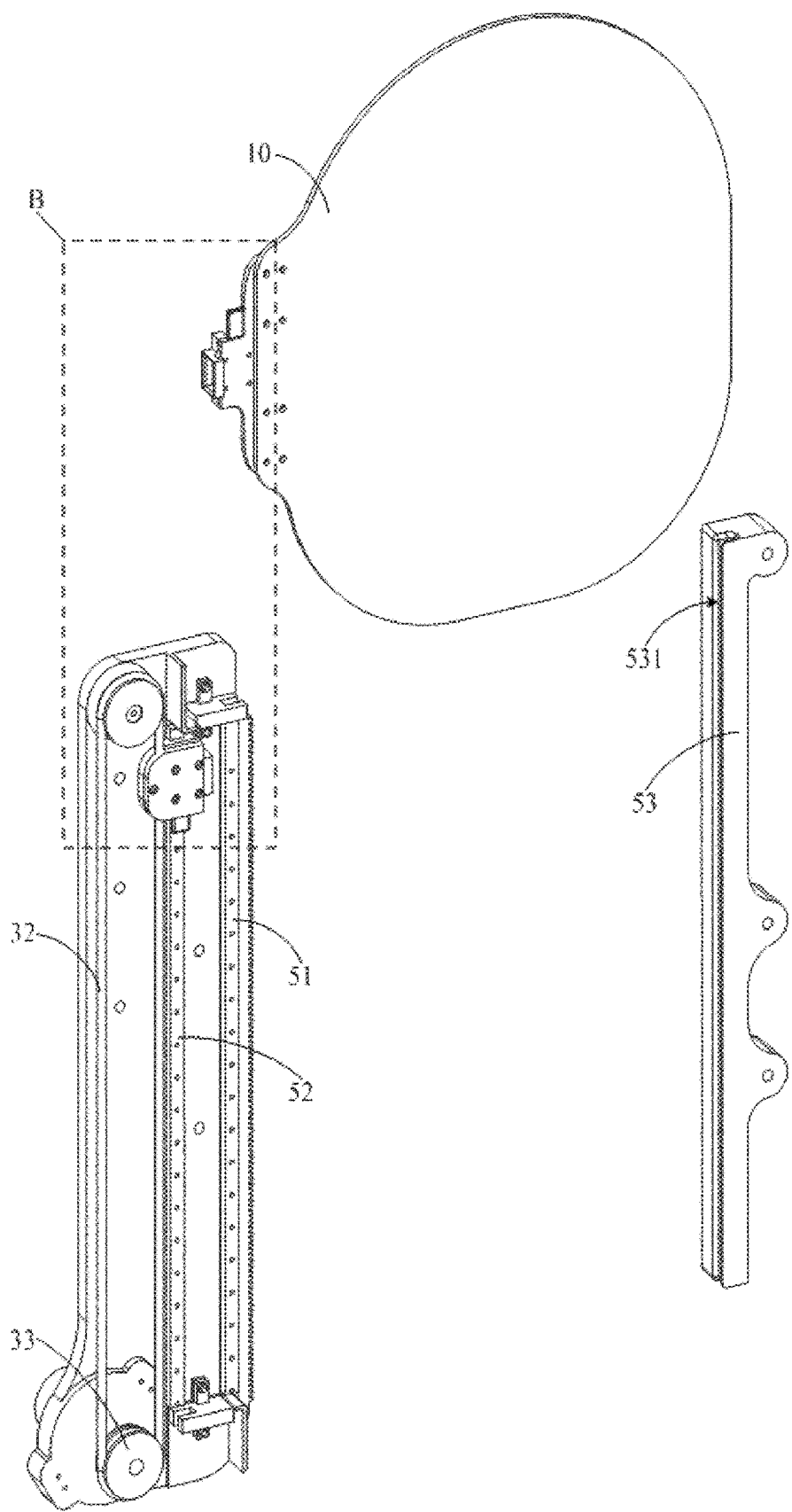
FIG. 3 is a disassembled schematic view of a pet movable door according to some embodiments of the present disclosure.
Figure 4:
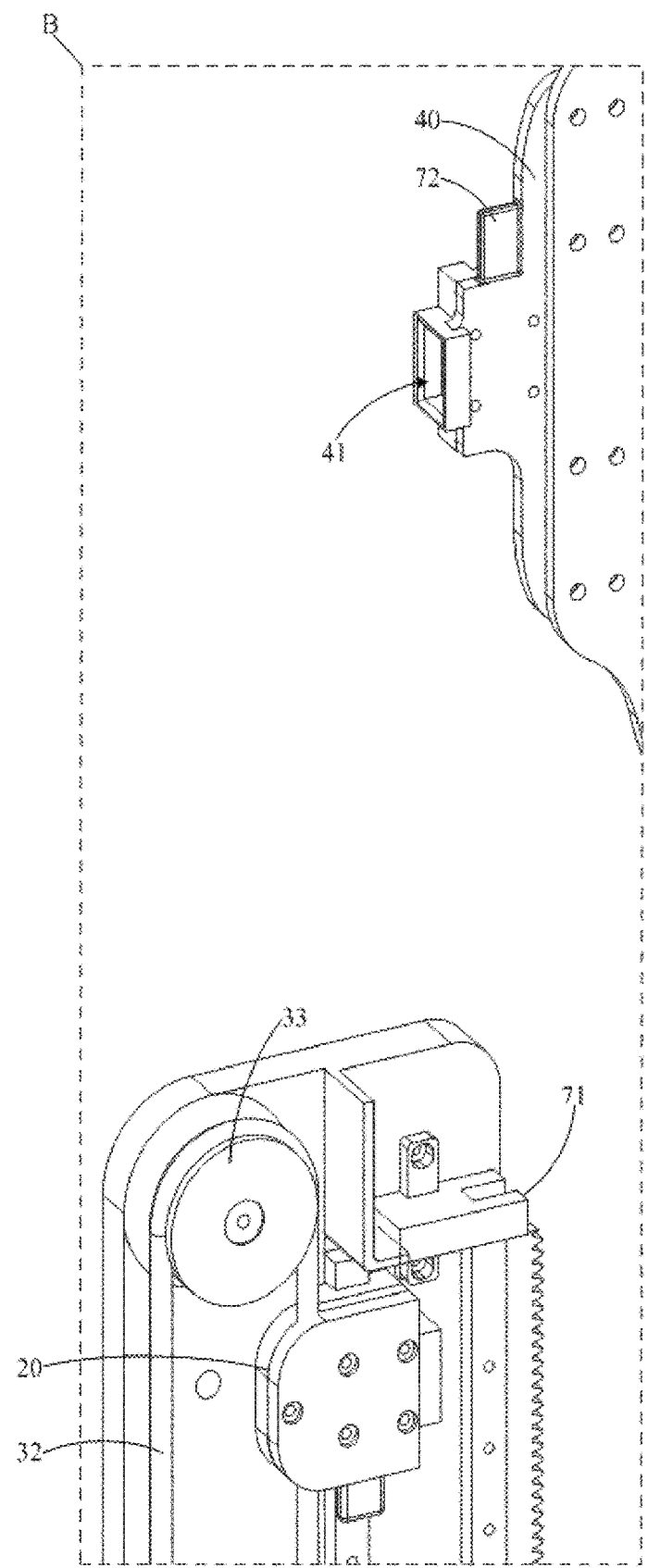
FIG. 4 is an enlarged view of area B circumscribed in FIG. 3.

In the embodiments of the present disclosure, referring to FIGS. 1 to 4, FIG. 1 is a structural schematic view of a pet movable door 100 according to some embodiments of the present disclosure, FIG. 2 is an enlarged view of area A circumscribed in FIG. 1, FIG. 3 is a disassembled schematic view of a pet movable door 100 according to some embodiments of the present disclosure, and FIG. 4 is an enlarged view of area B circumscribed in FIG. 3.

The pet movable door 100 includes a door panel 10, a clutch structure, and a drive unit 30. The drive unit 30 is connected to the door panel 10 in a transmission-manner via the clutch structure to drive the door panel 10 to move in a predetermined direction. The clutch structure is configured to separate from each other when a force acting in a direction opposite to the predetermined direction reaches a predetermined value, such that the door panel 10 is separated from the drive unit 30.

In the embodiments, the predetermined direction may be an up-down direction, a horizontal direction, a direction at an angle with the up-down direction and the horizontal direction, or a peripheral direction, etc., without limitation. The drive unit 30 drives the clutch structure to move along the predetermined direction, and the door panel 10 is driven to move synchronously through the clutch structure, thereby achieving indirect driving of the door panel 10 by the drive unit 30.

The clutch structure includes a first connecting body and a second connecting body. The first connecting body and the second connecting body may be two magnetic structures that attract each other magnetically, two adhesive structures that adhere to each other, a friction clutch, etc., without limitation. In a case where the first connecting body and the second connecting body are subjected to forces, one of which is opposite to the predetermined direction and the other of which is along the predetermined direction, the first connecting body and the second connecting body separate from each other when a difference in the forces reaches the predetermined value. For example, when the first connecting body is connected to the drive unit 30 in a transmission-manner, and the second connecting body is connected to the door panel 10, in a case where the drive unit 30 drives the first connecting body to move upward and an external force applied downward to the second connecting body reaches the predetermined value, the first connecting body and the second connecting body can be separated from each other. After the first connecting body and the second connecting body are separated from each other, the first connecting body is still connected to the drive unit 30, and the second connecting body is still fixed to the door panel 10. The door panel 10 can be reconnected to the drive unit 30 by the user manually connecting the first coupling member and the second coupling member together again.

It is understood that the predetermined value should be less than or equal to a preset breaking force of the pet. For example, when the pet is caught by the door panel 10 during movement when passing through the pet movable door 100, the drive unit 30 will continue to drive the door panel 10 to continue to squeeze the pet. When the breaking force of the pet reaches the predetermined value, the clutch structure can be separated, in which case the door panel 10 disengages from the drive unit 30 and the driving force of the drive unit 30 is withdrawn from the door panel 10, such that the pet can squeeze or push open the door panel 10 in a direction opposite to the driving force of the drive unit 30 to escape. In this way, harm to the pet, which is caused by the drive unit 30 continuously driving the door panel 10 to clamp the pet, may be prevented, such that the safety performance of the pet movable door 100 may be improved.

In some embodiments, the pet movable door 100 further includes a door panel guide 50, on which a preset track extending in the predetermined direction is formed; the door panel 10 is slidably connected to the preset track in the predetermined direction.

In the embodiments, the preset track of the door panel guide 50 may limit and guide the door panel 10, such that even if the door panel 10 is separated from the drive unit 30, it will not be separated from the door panel guide 50, but will continue to be connected to the door panel guide 50, in which case the door panel 10 is separated from the drive unit 30. In this way, the user can easily find and then attach the door panel 10 to an adaptor 20 in time to restore the automatic opening and closing function of the door panel 10. Compared with a conventional implementation that causes the door panel 10 to fall off directly, the present embodiments may prevent the door panel 10 from falling off onto the ground and injuring the user, children, other pets, and further prevent the user from being frightened by the loud collision sound, thereby improving the safety and reliability of the product.

After the pet has escaped, the door panel 10 and the drive unit 30 are still in a separated state. The door panel 10, which has lost its driving force, will move under the action of gravity or inertia and then stop at a preset position, such that the door panel will automatically open. In this case, the pet can freely enter and exit without being caught in the door panel. Since the door panel 10 is still connected to the door panel guide 50, when the user notices that the door panel 10 has become detached from the adapter 20, he/she can manually reinstall the door panel 10 in time, that is, slide the door panel 10 along the first preset track such that the clutch structure is connected again. In this way, it is convenient for the user to restore the door panel 10, thereby improving the convenience of using the pet movable door 100.

Specifically, the clutch structure includes an adapter 20 and a connecting member 40 fixedly connected to the door panel 10; the adapter 20 and the connecting member 40 are configured to separate from each other when a force acting in a reverse direction to a driving force from the drive unit 30 reaches a predetermined value.

The structure and shape of the adapter 20 and the connecting member 40 may be various, such as plate-shaped, block-shaped, etc., which is not specifically limited herein. The adapter 20 is connected to the drive unit 30 in a transmission manner, and the connecting member 40 is fixedly connected to the door panel 10. The adapter 20 and the connecting member 40 may be coupled and uncoupled by means of magnetic attraction, adhesion, friction, etc. When the adapter 20 and the connecting member 40 are subjected to forces, that are in reverse directions, between which a difference reaches a predetermined value, the two separate from each other, thereby achieving the separation of the drive unit 30 from the door panel 10.

The preset track may be a protruding structure or a concave structure. Specifically, as shown in FIG. 1, the door panel guide 50 includes a first guide rod 51 extending in an up-down direction. The preset track extends along the length direction of the first guide rod 51, and the connecting member 40 is slidably engaged with the first guide rod 51.

The first guide rod 51 provides a limit and guide function for the connecting member 40, guiding the door panel 10 to move precisely along the up-down direction, and avoiding jamming and derailing. The connecting member 40 may define a first guide groove adapted to the first guide rod 51, and the first guide rod 51 cooperates with the first guide groove such that the door panel 10 can move along the preset track. Since the first guide rod 51 extends along the up-down direction, the door panel 10 moves in the up-down direction. When the clutch structure is separated from each other (the adapter 20 is separated from the connecting member 40), that is, the door panel 10 is separated from the drive unit 30, the door panel 10 will slide downward under the action of gravity and the guidance of the first guide rod 51 to a lowest position, such that the door panel 10 can be automatically opened under the action of gravity, thereby effectively avoiding the situation of trapping the cat.

Accordingly, the pet movable door 100 further includes a second guide rod 52 extending in the up-down direction. The second guide rod 52 is slidably engaged with the adapter 20, and the drive unit 30 is connected to the adapter 20 in a transmission manner to drive the door panel 10 to reciprocate in the up-down direction. The first guide rod 51 is arranged in parallel with the second guide rod 52. The adapter 20 may define a second guide groove adapted to the second guide rod 52. The second guide rod 52 cooperates with the second guide groove such that the adapter 20 can reciprocate along the up-down direction. The second guide rod 52 limits and guides the adapter 20, guiding the precise movement of the clutch structure along the up-down direction to avoid jamming and derailment.

After the door panel 10 is separated from the adapter 20, it will accelerate during the downward sliding process. If the door panel 10 hits the bottom door frame at a high speed, it may cause damage to the door panel 10 or the door frame.

Figure 5:
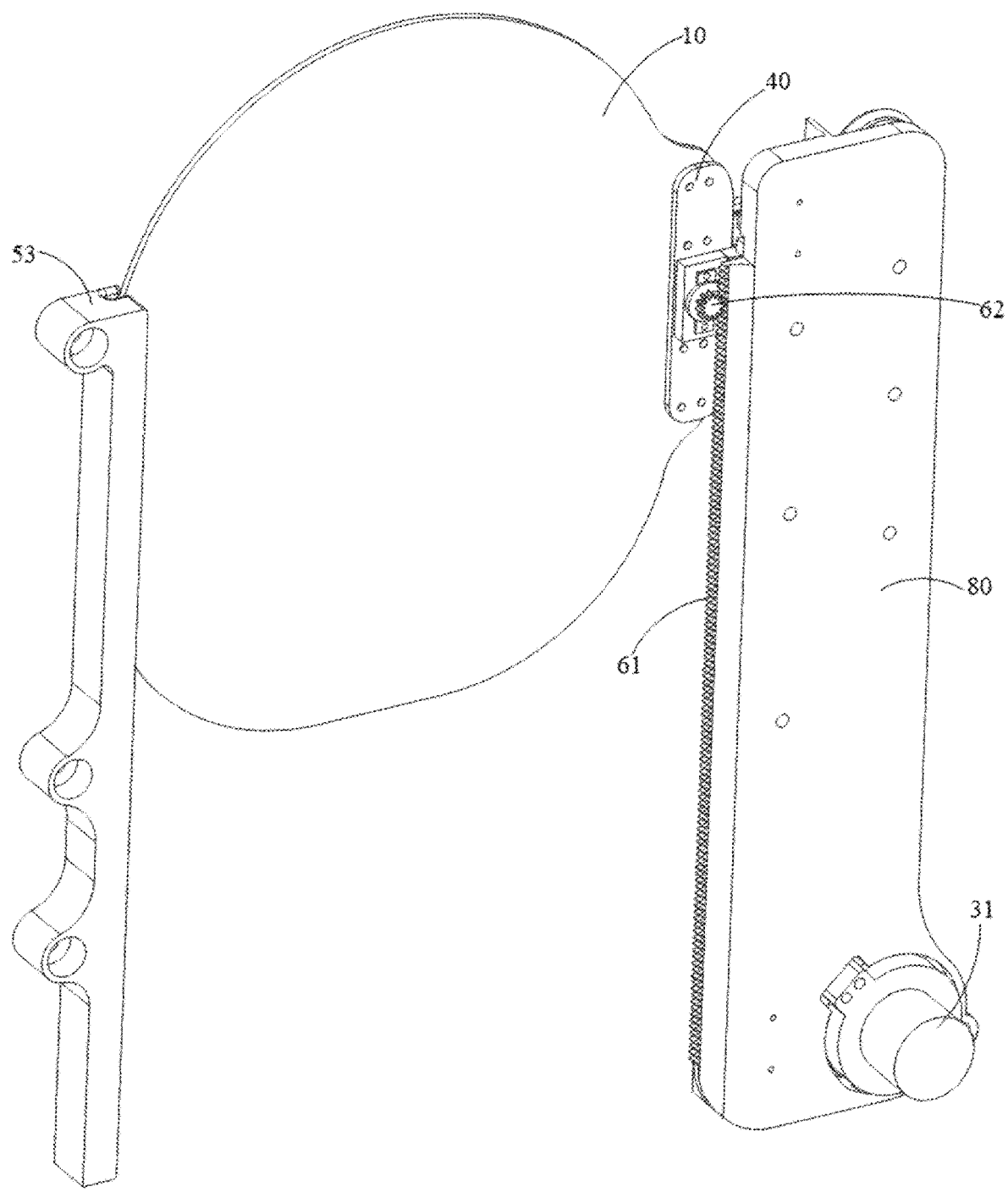
FIG. 5 is a structural schematic view of a pet movable door according to other embodiments of the present disclosure.

In some embodiments, as shown in FIG. 5, FIG. 5 is a structural schematic view of a pet movable door 100 according to other embodiments of the present disclosure. The pet movable door 100 further includes a reduction rack 61 and a reduction gear 62. The reduction rack 61 extends in the up-down direction, the reduction gear 62 is rotatably arranged on the door panel 10 and/or the connecting member 20, and the reduction rack 61 is engaged with the reduction gear 62.

During the up-down movement of the door panel 10, the reduction gear 62 rotates along the reduction rack 61, and the rotation process will generate a certain frictional force. When the door panel 10 slides down under the action of gravity, the frictional force between the reduction gear 62 and the reduction rack 61 can hinder the acceleration of the door panel 10 and cushion the fall of the door panel 10, thereby avoiding the door panel 10 from impacting the bottom door frame at high speed, so as to improve the protection effect on the door panel 10 and the door frame, while further avoiding loud collision sounds and improving the reliability of the product. The number of teeth and other relevant parameters of the reduction rack 61 and the reduction gear 62 may be selected and designed according to specific needs, which is not specifically limited herein.

In practical applications, as shown in FIGS. 1, 3, and 5, the pet movable door 100 further includes an installation plate 80; the reduction rack 61, the drive unit 30, the door panel guide 50, and the second guide rod 52 are fixedly arranged on the installation plate 80, and the door panel 10 and the adapter 20 are spaced apart from the installation plate 80. The mounting plate 80 can provide a mounting base for the reduction rack 61, the drive unit 30, the door panel guide 50, and the second guide rod 52, thereby achieving an integrated installation of the reduction rack 61, the drive unit 30, the door panel guide 50, and the second guide rod 52 on the mounting plate 80, so as to improve the structural stability of the reduction rack 61, the drive unit 30, the door panel guide 50, and the second guide rod 52.

After the door panel 10 has moved to a highest preset position, i.e. after the door panel 10 has opened the entrance 210 to a maximum extent, the drive motor is required to be stopped in time to prevent the door panel 10 from being damaged by continuous extrusion.

Figure 8:
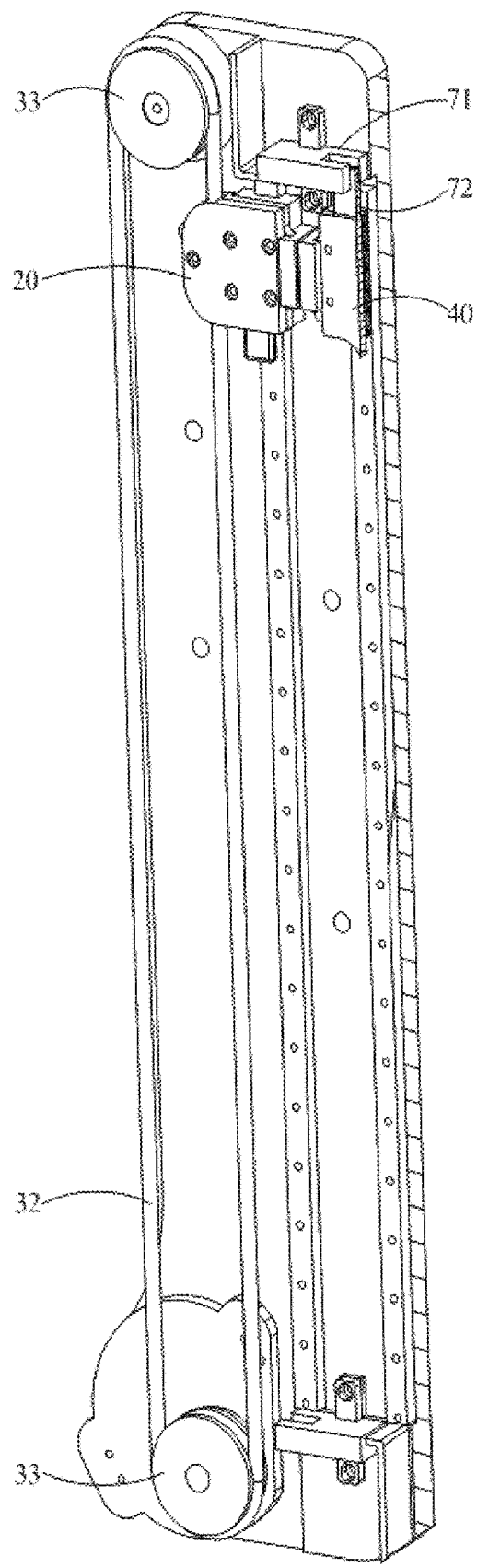
FIG. 8 is a cross-sectional schematic view of a pet movable door according to other embodiments of the present disclosure.

In some embodiments, as shown in FIGS. 4 and 8, FIG. 8 is a cross-sectional schematic view of a pet movable door 100 according to other embodiments of the present disclosure.

The pet movable door 100 further includes an inductive switch 71 and a trigger 72; the connecting member 40 is connected to a side of the door panel 10 facing the adapter 20; the trigger 72 is arranged on an upper end of the connecting member 40; the inductive switch 71 is arranged on a top end of the first guide rod 51; the inductive switch 71 is electrically connected to the drive unit 30, to control the drive unit 30 to stop when triggered by the trigger 72.

The inductive switch 71 may be a Hall switch, an infrared inductive switch 71, etc., without limitation. When the door panel 10 moves to the highest preset position, the trigger 72 triggers the inductive switch 71, and the inductive switch 71 controls the drive unit 30 to stop, so as to prevent the door panel 10 from being continuously subjected to a force. The door panel 10 will remain in the highest preset position, and after a preset period of time or after the pet leaves the cat litter box, the main control panel will control the drive unit 30 to reverse-drive the door panel 10 such that the door panel 10 closes the entrance 210.

Specifically, the clutch structure further includes a magnet attracter and a magnetic member that are magnetically coupled to each other; the magnet attracter is fixedly arranged on the connecting member 40 and the magnetic member is fixedly arranged on the adapter 20. The magnet attracter and the magnetic member can be magnetically coupled when they are close to each other, facilitating the clutch fixation of the adapter 20 and the connecting member 40, and thereby facilitating the clutch fixation of the door panel 10 and the adapter 20. Further, the magnetic attracter and the magnetic member are more easily separated after being subjected to a predetermined force, and will not easily get stuck, thereby improving the working effect of the clutch structure.

Figure 6:
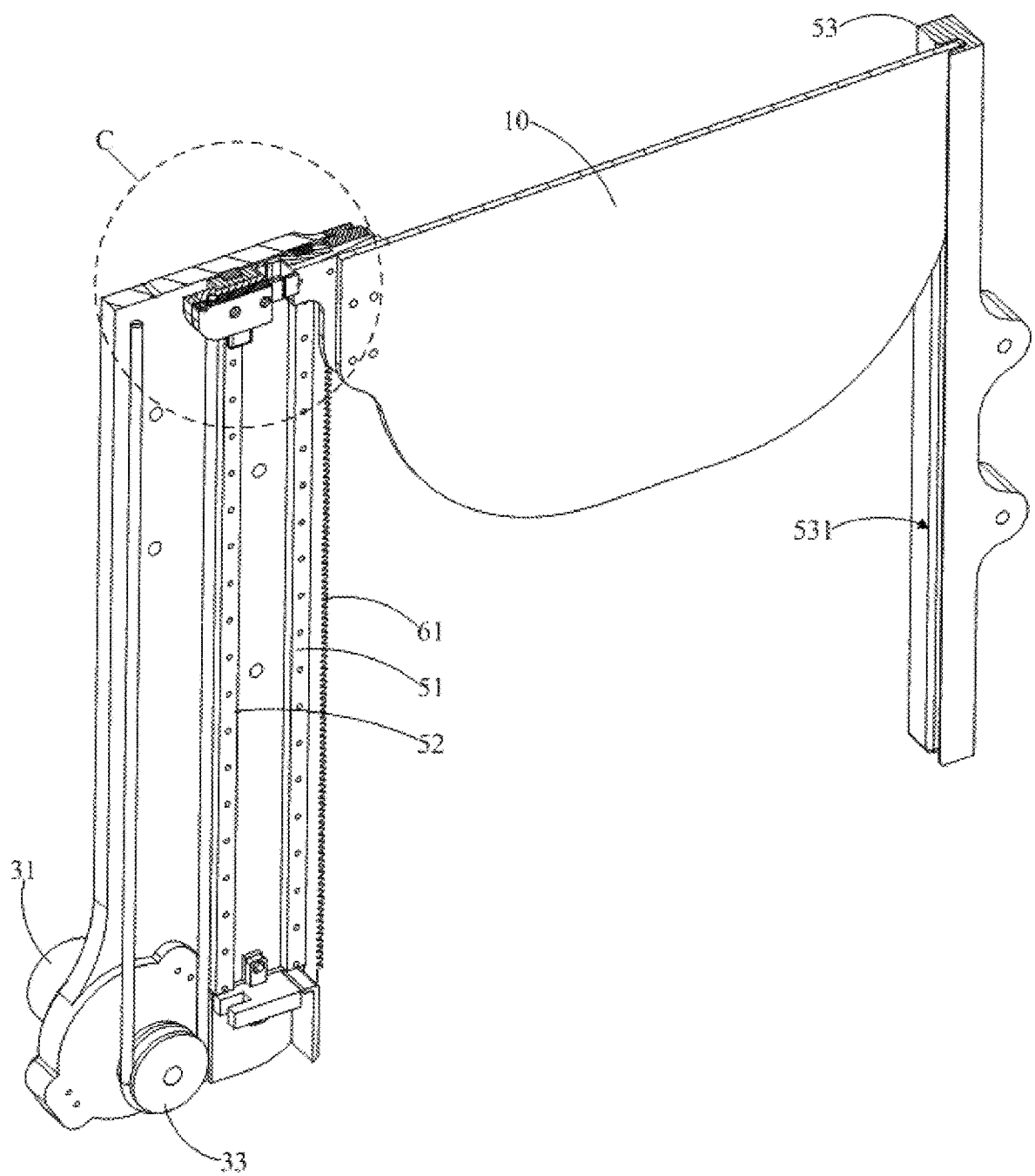
FIG. 6 is a cross-sectional schematic view of a pet movable door according to some embodiments of the present disclosure.
Figure 7:
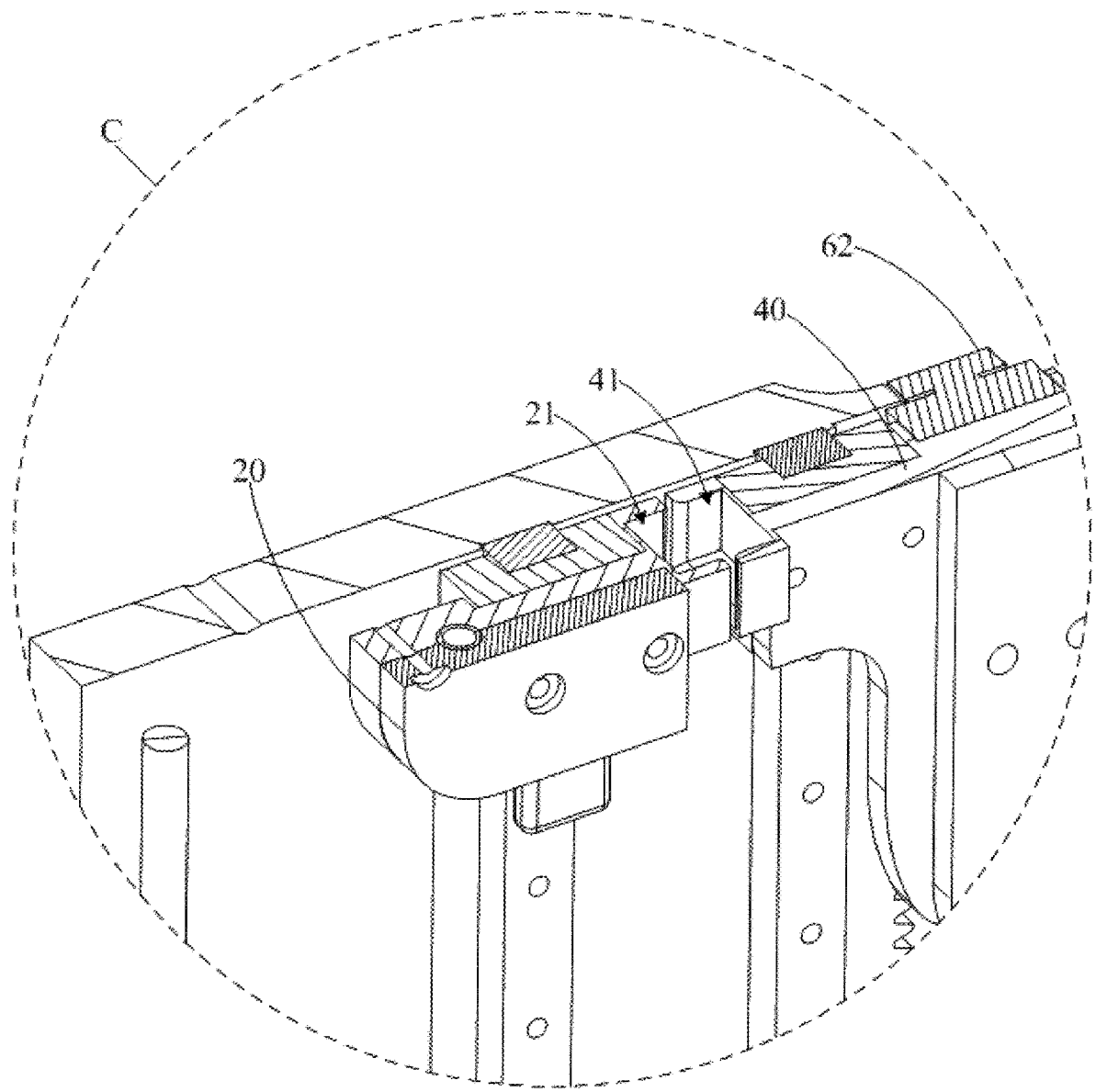
FIG. 7 is an enlarged view of area C circumscribed in FIG. 6.

In practical applications, as shown in FIGS. 6 and 7, FIG. 6 is a cross-sectional schematic view of a pet movable door 100 according to some embodiments of the present disclosure, and FIG. 7 is an enlarged view of area C circumscribed in FIG. 6. The connecting member 40 defines a first mounting slot 41, the first mounting slot 41 having a notch facing the adapter 20, and the magnetic attracter is arranged in the first mounting slot 41; and/or, the adapter 20 defines a second mounting slot 21, the second mounting slot 21 having a notch facing the connecting member 40, and the magnetic member is arranged in the second mounting slot 21. In this way, the installation stability of the magnetic attracter and the magnetic member may be improved.

In some embodiments, as shown in FIGS. 1 and 5, the door panel guide 50 further includes a guide rod 53 extending in the up-down direction; the guide rod 53 defines a guide slot 531 extending in the up-down direction; one of both vertical side walls of the door panel 10 is slidably connected to the first guide rod 51 via the connecting member 40, and the other of the both vertical side walls of the door panel 10 slidably engages with the guide slot 531. The two vertical side walls of the door panel 10 are guided and limited, which may further improve the stability of the movement of the door panel 10 and effectively prevent the door panel 10 from falling out after the door panel 10 is disengaged from the adapter 20.

The drive unit 30 may take on many different forms, for example, it may be a hydraulic cylinder or a linear motor.

In some embodiments, as shown in FIGS. 1, 3 and 5, the drive unit 30 includes a drive member 31 and a transmission member, the transmission member extending in a predetermined direction; the transmission member is connected to the clutch structure, such that when the drive member 31 drives the transmission member to move, the clutch structure is driven to move the door panel 10 along the predetermined direction.

The transmission member may be a screw, and the adapter 20 of the clutch structure is required to be connected to a nut of the screw, such that the adapter 20 can move in a straight line along with the operation of the drive member 31.

In a specific embodiment, as shown in FIGS. 1, 3 and 5, the drive member 31 is a drive motor, and the transmission member includes a transmission belt 32 and two transmission wheels 33; the two transmission wheels 33 are arranged at intervals along the up-down direction; two ends of the transmission belt 32 are respectively sleeved on the two transmission wheels 33; the adapter 20 is fixedly connected to the transmission belt 32, and an output shaft of the drive motor is connected to one of the transmission wheels 33 in a transmission manner. The rotation of the output shaft is converted into linear motion of the adapter 20 by the transmission belt 32 and the transmission wheel 33, which simplifies the overall structure of the drive unit 30 and improves the working stability of the drive unit 30.

Figure 9:
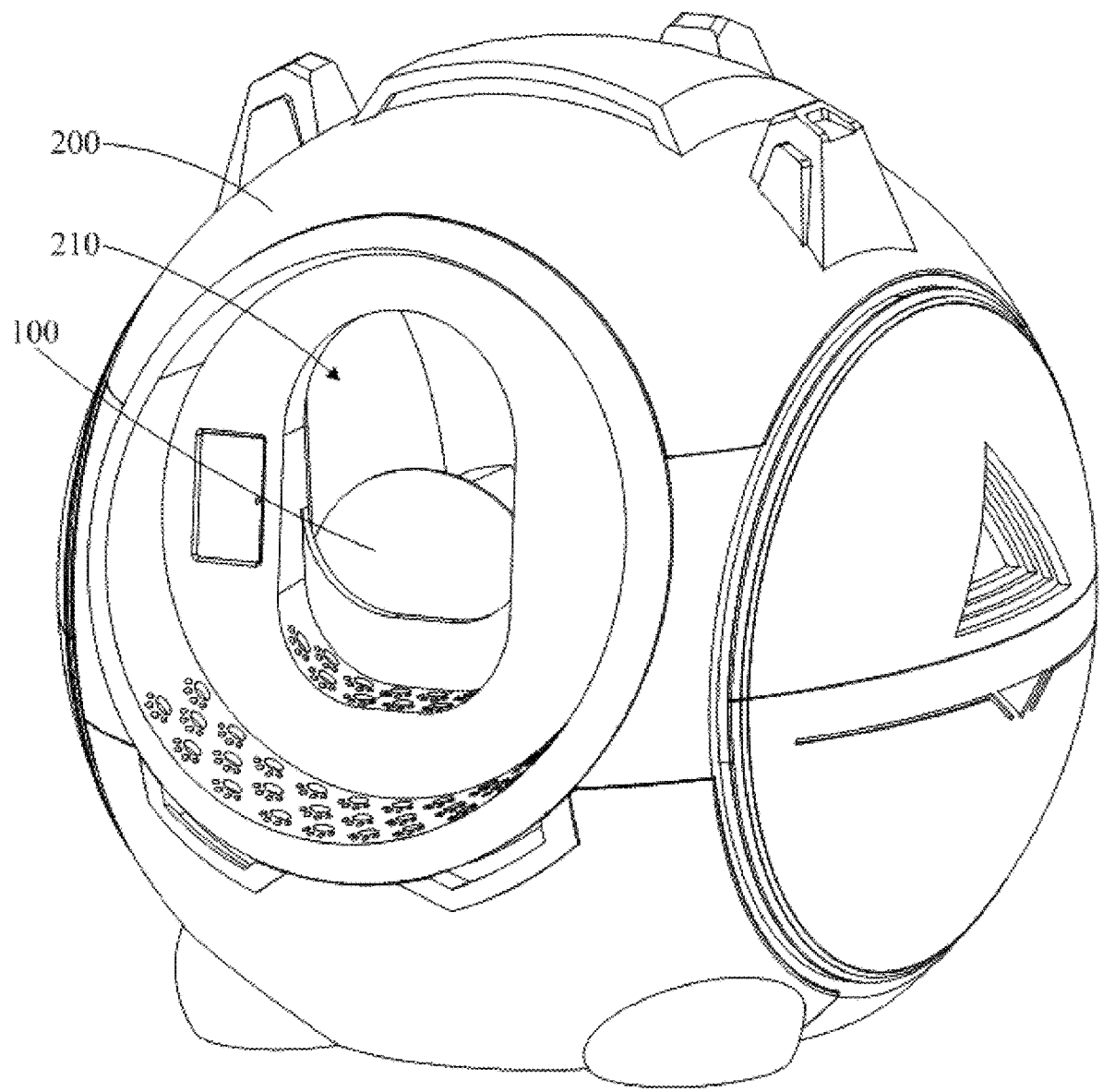
FIG. 9 is a structural schematic view of a cat litter box according to some embodiments of the present disclosure.

For example, as shown in FIG. 9, FIG. 9 is a structural schematic view of a cat litter box according to some embodiments of the present disclosure.

The present disclosure further proposes a cat litter box, which includes a shell body 200 and a pet movable door 100. The specific structure of the pet movable door 100 refers to the above embodiments. Since the cat litter box adopts all the technical solutions of all the above embodiments, it has at least all the beneficial effects brought about by the technical solutions of the above embodiments, which will not be described in detail herein. In particular, the shell body 200 defines the entrance 210, and the pet movable door 100 is arranged at the entrance 210, such that the door panel 10 of the pet movable door 100 can open or close the entrance 210.

In the technical solutions of the present disclosure, the door panel 10 is connected to the adapter 20 by a detachable structure, such that when the door panel 10 is accidentally stuck by the pet cat during movement, the detachable structure can be separated from each other in time, and the driving force of the driving unit 30 on the door panel 10 can be removed in time, so as to prevent the door panel 10 from continuing to exert force and causing injury to the pet cat, thereby improving the safety performance of the pet movable door 100. Since the door panel 10 can only move along a preset track, after the door panel 10 loses its driving force due to disengagement from the drive unit 30, it will open along the preset track under the action of gravity or inertia. When the user needs to reinstall the door panel 10, he/she only needs to manually drive the door panel 10 along the preset track until the clutch structure is connected. In this way, the difficulty of reinstalling the door panel 10 is reduced, thereby improving ease of use.

Finally, it should be noted that the above embodiments are only intended to illustrate the technical solution of the present disclosure, not to limit it. Although the present disclosure has been described in detail with reference to the foregoing embodiments, those skilled in the art will understand that the technical solutions recorded in the foregoing embodiments can be modified, or some of the technical features can be replaced by equivalents; and these modifications or replacements do not drive the essence of the corresponding technical solution out of the spirit and scope of the technical solutions of the embodiments of the present disclosure.

What is claimed is:

1. A pet movable door, comprising: a door panel, a clutch structure, and a drive unit;
   wherein the drive unit is connected to the door panel in a transmission-manner via the clutch structure, to drive the door panel to move in a predetermined direction; the clutch structure is configured to separate from each other when a force acting in a direction opposite to the predetermined direction reaches a predetermined value, such that the door panel is separated from the drive unit;
   wherein the pet movable door further comprises a door panel guide, and a preset track extending in the predetermined direction is formed on the door panel guide; the door panel is slidably connected to the preset track in the predetermined direction;
   wherein the clutch structure comprises an adapter and a connecting member fixedly connected to the door panel; the adapter and the connecting member are configured to separate from each other when the force acting in a reverse direction to a driving force from the drive unit reaches a predetermined difference value;
   the door panel guide comprises a first guide rod extending in an up-down direction; the preset track extends along a length direction of the first guide rod, and the connecting member is slidably engaged with the first guide rod; and/or
   the pet movable door further comprises a second guide rod extending in the up-down direction; the second guide rod is slidably engaged with the adapter, and the drive unit is connected to the adapter in a transmission manner to drive the door panel to reciprocate in the up-down direction.

2. A pet movable door, comprising: a door panel, a clutch structure, and a drive unit;
   wherein the drive unit is connected to the door panel in a transmission-manner via the clutch structure, to drive the door panel to move in a predetermined direction; the clutch structure is configured to separate from each other when a force acting in a direction opposite to the predetermined direction reaches a predetermined value, such that the door panel is separated from the drive unit;
   wherein the pet movable door further comprises a reduction rack and a reduction gear; the reduction rack extends in an up-down direction, the reduction gear is rotatably arranged on the door panel and/or the connecting member, and the reduction rack is engaged with the reduction gear.

3. The pet movable door according to claim 1, wherein the pet movable door further comprises an installation plate; the reduction rack, the drive unit, the door panel guide, and the second guide rod are fixedly arranged on the installation plate, and the door panel and the adapter are spaced apart from the installation plate.

4. The pet movable door according to claim 1, wherein the pet movable door further comprises an inductive switch and a trigger; the connecting member is connected to a side of the door panel facing the adapter; the trigger is arranged on an upper end of the connecting member; the inductive switch is arranged on a top end of the first guide rod; the inductive switch is electrically connected to the drive unit, to control the drive unit to stop when triggered by the trigger.

5. The pet movable door according to claim 1, wherein the door panel guide further comprises a guide rod extending in the up-down direction; the guide rod defines a guide slot extending in the up-down direction; one of both vertical side walls of the door panel is slidably connected to the first guide rod via the connecting member, and the other of the both vertical side walls of the door panel slidably engages with the guide slot.

6. The pet movable door according to claim 1, wherein the clutch structure further comprises a magnet attracter and a magnetic member that are magnetically coupled to each other; the magnet attracter is fixedly arranged on the connecting member, and the magnetic member is fixedly arranged on the adapter.

7. The pet movable door according to claim 1, wherein the drive unit comprises a drive member and a transmission member, the transmission member extending in the predetermined direction; the transmission member is connected to the clutch structure, such that the clutch structure is driven to move the door panel along the predetermined direction in condition of the drive member driving the transmission member to move.

8. The pet movable door according to claim 7, wherein the drive member is a drive motor, and the transmission member comprises a transmission belt and two transmission wheels; the two transmission wheels are arranged at intervals along the up-down direction; two ends of the transmission belt are respectively sleeved on the two transmission wheels; the adapter is fixedly connected to the transmission belt, and an output shaft of the drive motor is connected to one of the transmission wheels in a transmission manner.

9. A cat litter box, comprising a shell body and a pet movable door; wherein the shell body defines an entrance, and the pet movable door is arranged at the entrance; the door panel of the pet movable door is capable of opening and of closing the entrance; wherein the pet movable door comprises: a door panel, a clutch structure, and a drive unit; the drive unit is connected to the door panel in a transmission-manner via the clutch structure, to drive the door panel to move in a predetermined direction; the clutch structure is configured to separate from each other when a force acting in a direction opposite to the predetermined direction reaches a predetermined value, such that the door panel is separated from the drive unit; wherein the pet movable door further comprises a reduction rack and a reduction gear; the reduction rack extends in an up-down direction, the reduction gear is rotatably arranged on the door panel and/or the connecting member, and the reduction rack is engaged with the reduction gear.

10. The cat litter box according to claim 9, wherein the pet movable door further comprises a door panel guide, and a preset track extending in the predetermined direction is formed on the door panel guide; the door panel is slidably connected to the preset track in the predetermined direction.

11. The cat litter box according to claim 10, wherein the clutch structure comprises an adapter and a connecting member fixedly connected to the door panel; the adapter and the connecting member are configured to separate from each other when the force acting in a reverse direction to a driving force from the drive unit reaches a predetermined difference value;
the door panel guide comprises a first guide rod extending in an up-down direction; the preset track extends along a length direction of the first guide rod, and the connecting member is slidably engaged with the first guide rod; and/or
the pet movable door further comprises a second guide rod extending in the up-down direction; the second guide rod is slidably engaged with the adapter, and the drive unit is connected to the adapter in a transmission manner to drive the door panel to reciprocate in the up-down direction.

12. The cat litter box according to claim 9, wherein the pet movable door further comprises an installation plate; the reduction rack, the drive unit, the door panel guide, and the second guide rod are fixedly arranged on the installation plate, and the door panel and the adapter are spaced apart from the installation plate.

13. The cat litter box according to claim 11, wherein the pet movable door further comprises an inductive switch and a trigger; the connecting member is connected to a side of the door panel facing the adapter; the trigger is arranged on an upper end of the connecting member; the inductive switch is arranged on a top end of the first guide rod; the inductive switch is electrically connected to the drive unit, to control the drive unit to stop when triggered by the trigger.

14. The cat litter box according to claim 11, wherein the door panel guide further comprises a guide rod extending in the up-down direction; the guide rod defines a guide slot extending in the up-down direction; one of both vertical side walls of the door panel is slidably connected to the first guide rod via the connecting member, and the other of the both vertical side walls of the door panel slidably engages with the guide slot.

15. The cat litter box according to claim 11, wherein the clutch structure further comprises a magnet attracter and a magnetic member that are magnetically coupled to each other; the magnet attracter is fixedly arranged on the connecting member, and the magnetic member is fixedly arranged on the adapter.

16. The cat litter box according to claim 9, wherein the drive unit comprises a drive member and a transmission member, the transmission member extending in the predetermined direction; the transmission member is connected to the clutch structure, such that the clutch structure is driven to move the door panel along the predetermined direction in condition of the drive member driving the transmission member to move.

17. The cat litter box according to claim 16, wherein the drive member is a drive motor, and the transmission member comprises a transmission belt and two transmission wheels; the two transmission wheels are arranged at intervals along the up-down direction; two ends of the transmission belt are respectively sleeved on the two transmission wheels; the adapter is fixedly connected to the transmission belt, and an output shaft of the drive motor is connected to one of the transmission wheels in a transmission manner.

18. The pet movable door according to claim 2, wherein the pet movable door further comprises a door panel guide, and a preset track extending in the predetermined direction is formed on the door panel guide; the door panel is slidably connected to the preset track in the predetermined direction.

19. The pet movable door according to claim 2, wherein the drive unit comprises a drive member and a transmission member, the transmission member extending in the predetermined direction; the transmission member is connected to the clutch structure, such that the clutch structure is driven to move the door panel along the predetermined direction in condition of the drive member driving the transmission member to move.

\* \* \* \* \*